United States Patent Office 3,272,784
Patented Sept. 13, 1966

3,272,784
COPOLYMERIC SULFONES
John L. Lang, 42 Windgate Drive, Box 820—111,
Murrysville, Pa.
No Drawing. Filed July 16, 1962, Ser. No. 210,237
3 Claims. (Cl. 260—79.3)

This invention relates to copolymers of sulfur dioxide with comonomers derived from the reaction of ar-vinylidene α-haloalkyl aromatic compounds with nucleophilic reagents, and the use of such copolymers.

More particularly, this invention relates to sulfone copolymers of functionally active monomers derived from ar-vinylidene-α-haloalkyl aromatic compounds.

Non-sulfone polymers of monomers derived from the reaction of ar-vinylidene-α-haloalkyl aromatic compounds and certain reagents have been prepared, usually in large amounts of solvents, which technique has obvious disadvantages, which have curtailed the use of, or even completely surpressed, these monomers and their polymers.

It is the object of this invention to provide a simple method for the preparation of novel sulfone copolymers of monomeric mixtures containing the reaction products of nucleophiles with ar-vinylidene-α-haloalkyl aromatic compounds, which polymers have valuable properties enabling their use as a flocculating agents, slime-control agents, thickeners, textile sizes, bonding of non-woven fabrics, adhesives, in the tanning of, or otherwise treating proteinaceous materials, suspending agents, clarifiers, chelating polymers, scavengers for soaps and "syndets," encapsulating agents, additives for cements and drilling muds, soil conditioners, paper pulping adjuncts, effluent water treatments, and many other applications. Another object of this invention is to provide a polymeric product having greater susceptibility to solvents, such as water, by reason of their more polar character than that of the heretofore available materials.

A still further object of this invention is to provide a process for preparing a product having a plurality of bonding sites connecting the several functional loci which are relatively susceptible to cleavage, e.g., by bacteria, or other means, than the previously known products, which have extensive carbon-to-carbon bond sequences, and are quite stable. This degradable property is extremely advantageous in minimizing contaminational overloading of effluents and the deleterious effect of this upon the limnological community.

It has now been discovered that these and related objects can be accomplished by the copolymerization of monomeric mixtures containing a reaction product of a nucleophile with an ar-vinylidene-α-haloalkyl aromatic compounds, with sulfur dioxide, and optionally others.

The use of such a system has many advantages. One advantage is the rapid polymerization rate of redox-initiated sulfur dioxide plus derived ar-vinylidene-α-haloalkyl aromatic compound comonomeric mixture.

An additional advantage is the greater polar character of the thus-produced polymeric product.

Another important advantage resides in the possibility of operation in a "reverse" suspension, i.e., a water-in-oil type suspension polymerication, thus using water as a solvent, instead of the usual expensive or noxious solvents.

Examples of ar-vinylidene-α-haloalkyl aromatic compounds whose reaction products with nucleophiles can be used as monomers include those having the structural formula:

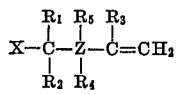

wherein Z is an aromatic nucleus; X is a halogen selected from the class consisting of chlorine and bromine; $R_1$ and $R_2$ are individually selected from the class consisting of hydrogen and lower alkyl radicals; $R_3$ is selected from the class consisting of hydrogen and methyl; and $R_4$ and $R_5$ are individually selected from the class consisting of hydrogen, chlorine, bromine and lower alkyl radicals. The method of preparing the ar-vinylidene-α-haloalkyl aromatic compounds is described in U.S. Patent No. 2,780,604.

Examples of such compounds are ar-vinyl benzyl chloride, ar-vinyl benzyl bromide, ar-isopropenyl benzyl-chloride or -bromide, ar-(1-chloromethyl)-ar-vinyl toluene, ar-(1-chloromethyl)-ar-vinyl-ar-chloro- and -polychlorobenzenes, ar-(1-chloromethyl)-ar-vinyl naphthalene, and the like, and mixtures thereof.

These α-halo-alkyl containing monomers can be reacted with a whole host of nucleophiles, including ammonia, mono-, di-, or tri-alkyl amines, especially trimethylamine, urea, thiourea, ethers, hydrogen sulfide, mercaptans, dialkyl sulfides, especially dimethyl sulfide, the picolines, quinoline, isoquinoline, 2,4-lutidine, iminodiacetic acid, bisulfites, and the like, and mixtures thereof, to produce useable monomeric species.

Examples of such compounds are ar-vinyl benzyl chloride, ar-vinyl benzyl bromide, ar-isopropenyl benzyl-chloride and -bromide, ar-(1-chloromethyl)-ar-vinyl toluene, ar-(1-bromomethyl)-ar-vinyl toluene, ar-(1-chloromethyl)-ar-vinyl naphthalene, ar-(1-chloromethyl)-ar-vinyl-ar-chlorobenzene, ar-(1-chloromethyl)-ar-vinyl-ar, ar-dichlorobenzene and the like, or mixtures thereof.

In the preparation of ternary and other multi-component systems, one or more comonomers may be selected from a wide variety of copolymerizable substances.

Examples of comonomeric materials which may be employed as added components to the ar-vinylidene-α-haloalkyl aromatic compound-sulfur dioxide system include such monomers and their equivalents as styrene, α-methyl styrene, chlorostyrene, dichlorostyrenes, vinyl toluene, vinyl xylene, vinyl cumene, tert-butyl styrene, vinylidene chloride, vinylidene chloride-bromide, butadiene, butene-1, acrylonitrile, and the like, and mixtures thereof.

The proportions of comonomers used can be varied within wide limits, producing copolymers having characteristic properties dependent upon the comonomer types and proportions.

When dispersibility in water is a requisite, at least 20% by weight of ar-vinylidene α-haloalkyl aromatic compound is needed to produce copolymers capable of being reacted with a suitable nucleophilic reagent to produce a derived polymer with the thus specified solubility characteristics.

The following examples are given merely in illustration, and are not to be construed as limiting the invention in any way.

Example I

A suspending agent was prepared using 200 parts by weight of ethyl benzene and 8.0 parts by weight finely ground bentonite. To this was added a monomeric solution of 20 parts by weight of ar-vinyl benzyl-trimethyl-ammonium chloride, 20.0 parts by weight of de-ionized water, and 0.02 part by weight of potassium persulfate. Ar-vinyl benzyl-trimethylammonium chloride is known in the art and can be prepared by the method described by Jones and Goetz in vol. 25, pages 201–215 of the Journal of Polymer Science (1957). The vessel and contents were cooled and 10.0 parts by weight of liquid sulfur dioxide added, the vessel closed, and polymerization effected at 60° C. The polymer-in-oil suspension was heated, thus removing the now-superfluous water by steam distillation.

The recovered dry spheroids of copolymeric sulfone were dissolved in water and the solution used to flocculate a suspension of koalin clay in water.

*Example II*

An experiment was conducted similar to that of Example I in even respect, except that the suspending agent was 10.0 parts by weight of a poly(ar-alkyl styrene).

I claim:
1. The process for preparing a water-dispersible polyelectrolyte comprising polymerizing (a) sulfur dioxide and (b) the reaction product of
   (i) a monomer having the general formula

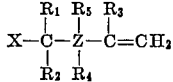

wherein
Z is an aromatic nucleus,
X is a halogen selected from the class consisting of hydrogen and lower alkyl radicals,
$R_1$ and $R_2$ are individually selected from the class consisting of hydrogen and lower alkyl radicals,
$R_3$ is selected from the class consisting of hydrogen and methyl, and
$R_4$ and $R_5$ are individually selected from the class consisting of hydrogen, chlorine, bromine and lower alkyl radicals; and
   (ii) a nucleophilic reagent.
2. The process for preparing a water-dispensible polyelectrolyte comprising polymerizing (a) sulfur dioxide and (b) the reaction product of ar-vinyl benzyl chloride and a nucleophilic reagent.
3. The process for preparing a water-dispersible polyelectrolyte comprising copolymerizing (a) sulfur dioxide and (b) the reaction product of ar-vinyl benzyl chloride and trimethylamine.

References Cited by the Examiner

UNITED STATES PATENTS 2,572,185  10/1951  Noether et al. _____ 260—79.3
2,645,631   7/1953  Crouch et al. _____ 260—79.3

JOSEPH L. SCHOFER, *Primary Examiner.*

WILLIAM H. SHORT, *Examiner.*

J. F. McNALLY, F. L. DENSON,
*Assistant Examiners.*

---

UNITED STATES PATENT OFFICE
CERTIFICATE OF CORRECTION

Patent No. 3,272,784                                September 13, 1966

John L. Lang

It is hereby certified that error appears in the above numbered patent requiring correction and that the said Letters Patent should read as corrected below.

Column 3, lines 20 and 21, strike out "hydrogen and lower alkyl radicals" and insert instead -- chlorine and bromine --.

Signed and sealed this 15th day of August 1967.

(SEAL)
Attest:

Edward M. Fletcher, Jr.                          EDWARD J. BRENNER
Attesting Officer                                Commissioner of Patents